(12) United States Patent
Yoshikawa et al.

(10) Patent No.: US 8,221,878 B2
(45) Date of Patent: Jul. 17, 2012

(54) PHOTOCURABLE COATING COMPOSITION, FILM FORMING METHOD, AND COATED ARTICLE

(75) Inventors: Yuji Yoshikawa, Annaka (JP); Kazuharu Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 280 days.

(21) Appl. No.: 12/700,778

(22) Filed: Feb. 5, 2010

(65) Prior Publication Data

US 2010/0203320 A1 Aug. 12, 2010

(30) Foreign Application Priority Data

Feb. 9, 2009 (JP) ................. 2009-027344

(51) Int. Cl.
  C08L 83/06 (2006.01)
  C08K 3/36 (2006.01)
  C08F 2/48 (2006.01)
  B32B 5/16 (2006.01)
  B32B 5/18 (2006.01)

(52) U.S. Cl. ............. 428/319.3; 524/588; 524/493; 427/515

(58) Field of Classification Search .............. None
  See application file for complete search history.

(56) References Cited

U.S. PATENT DOCUMENTS

| | | | |
|---|---|---|---|
| 6,207,728 B1 | 3/2001 | Sekiguchi et al. | |
| 6,558,804 B2 * | 5/2003 | Sato et al. ............. | 428/447 |
| 6,855,375 B2 * | 2/2005 | Nakagawa et al. ........ | 427/387 |
| 7,226,982 B2 | 6/2007 | Yamaya et al. | |
| 7,270,887 B2 | 9/2007 | Yamaya et al. | |
| 7,351,477 B2 | 4/2008 | Yamaya et al. | |
| 7,982,953 B2 * | 7/2011 | Fukuda et al. .......... | 359/487.01 |
| 2003/0008244 A1 * | 1/2003 | Khanarian et al. ........ | 430/321 |
| 2003/0187088 A1 * | 10/2003 | Yoshikawa et al. ........ | 522/172 |
| 2006/0198021 A1 * | 9/2006 | Fukuda et al. ........... | 359/490 |
| 2006/0240268 A1 | 10/2006 | Yamaya et al. | |
| 2006/0269733 A1 | 11/2006 | Mizuno et al. | |
| 2007/0057253 A1 * | 3/2007 | Gronbeck et al. ......... | 257/40 |
| 2007/0177271 A1 * | 8/2007 | Matsunaga .............. | 359/582 |
| 2007/0243394 A1 * | 10/2007 | Yamaya et al. .......... | 428/447 |
| 2007/0243395 A1 | 10/2007 | Yamaya et al. | |
| 2007/0244250 A1 * | 10/2007 | Yoshikawa et al. ........ | 524/588 |
| 2008/0187727 A1 * | 8/2008 | Yokoi ................. | 428/195.1 |
| 2009/0043025 A1 | 2/2009 | Tsujimoto et al. | |
| 2009/0148789 A1 * | 6/2009 | Amara et al. ........... | 430/270.1 |

FOREIGN PATENT DOCUMENTS

| | | |
|---|---|---|
| JP | 7-133105 | 5/1995 |
| JP | 2000-001648 | 1/2000 |
| JP | 2000-119634 | 4/2000 |
| JP | 2000-171604 | 6/2000 |
| JP | 2001-233611 | 8/2001 |
| JP | 2002-79616 | 3/2002 |
| JP | 2004-272197 | 9/2004 |
| JP | 2004-315712 | 11/2004 |
| JP | 2005-99778 | 4/2005 |
| JP | 2005-266051 | 9/2005 |
| JP | 2005-298573 | 10/2005 |
| JP | 2005-338549 | 12/2005 |
| JP | 2006-139259 | 6/2006 |
| JP | 2007-146106 | 6/2007 |
| JP | 2008-038086 | 2/2008 |
| WO | WO 2006/093156 A1 | 9/2006 |

OTHER PUBLICATIONS

Japanese Office Action issued Jun. 8, 2011, in Patent Application No. 2009-027344.

* cited by examiner

*Primary Examiner* — Robert S Loewe

(74) *Attorney, Agent, or Firm* — Oblon, Spivak, McClelland, Maier & Neustadt, L.L.P.

(57) ABSTRACT

A photocurable coating composition is provided comprising (1) porous or hollow inorganic oxide fine particles, (2) a hydrolytic condensate of a bissilane compound or a cohydrolytic condensate of a bissilane compound and another hydrolyzable organosilicon compound, and (3) a photoacid generator. Due to the presence of voids in the resin, the cured coating has a low refractive index.

19 Claims, No Drawings

PHOTOCURABLE COATING COMPOSITION, FILM FORMING METHOD, AND COATED ARTICLE

CROSS-REFERENCE TO RELATED APPLICATION

This non-provisional application claims priority under 35 U.S.C. §119(a) on Patent Application No. 2009-027344 filed in Japan on Feb. 9, 2009, the entire contents of which are hereby incorporated by reference.

TECHNICAL FIELD

This invention relates to a photocurable coating composition useful in forming an antireflective film, a method for forming a film from the coating composition, and a coated article.

BACKGROUND ART

In many optical articles including various displays such as computer displays, TV and plasma displays, liquid crystal display devices, transparent plastic lenses, covers in various instruments, and window panes in automobiles and trains, antireflective films are often used as the outermost layer for the purpose of improving visibility. The antireflection principle requires that the antireflective film have a low refractive index.

Fluoroplastics are employed in the antireflective application as in displays because they essentially have a low refractive index and satisfactory alkali resistance. However, the fluoroplastics are often used as rubber due to their molecular structure and unsuitable to form hard protective coatings having mar resistance.

Recently, hydrolyzable silane compounds having perfluoroalkyl groups were developed. To take advantage of their favorable characteristics, a variety of coating compositions comprising hydrolyzable silane compounds have been developed for imparting alkali resistance, water repellency, oil repellency, anti-staining and anti-reflection. However, since perfluoroalkyl groups contributing to these favorable characteristics are bulky and inert, the cured coatings have a low crosslink density. As a result, the cured coatings are fairly hard as compared with fluoroplastics, but still insufficient in mar resistance.

For the purpose of enhancing mar resistance, JP-A 2000-119634 proposes co-hydrolysis of a perfluoroalkyl-containing silane and a silane compound such as a tetraalkoxysilane; and JP-A 2004-315712 proposes a material based on a bissilane compound having perfluoroalkylene as a spacer. These systems achieve satisfactory levels of mar resistance and adhesion, but are less antireflective because of a less reduction of refractive index.

In view of the fact that the material having the lowest refractive index is air, hollow inorganic fine particles are devised for the purpose of taking air into the structure of a cured coating. One proposal is a porous or hollow silica sol (JP-A H07-133105 and JP-A 2001-233611). On use, the silica sol is mixed with a fluorinated alkyl-containing silicone (JP-A 2002-79616) or dispersed in a binder component containing an ionizing radiation curable monomer (JP-A 2004-272197). In the follow-up test, the inventors found that when the hollow silica sol is mixed with an organic solvent solution of any of the foregoing binders, uniform dispersion is observed, but upon volatilization of the organic solvent, the hollow silica particles emerge and float on the coating surface due to their internal voids. As a result, the cured coating as a whole displays satisfactory antireflection properties, but unsatisfactory mar resistance because many hollow silica particles which are weak in strength on account of the hollow structure are present on the surface and loosely bound by the binder component. In addition, the cured coating has poor alkali resistance as the drawback of silica.

For the purpose of overcoming the drawback of hollow silica sol, an attempt is made to surface treat hollow silica particles with a fluorinated alkyl-containing silane compound and mix and disperse the hollow silica particles in a binder derived from tetraalkoxysilane (JP-A 2005-266051). Although the coverage of the particle surface with hydrophobic groups improves alkali resistance, this method relying only on mixing step is not successful in preventing hollow silica particles from emerging, failing to improve mar resistance. In another attempt, a hollow silica sol is surface treated with a silane compound containing an ionizing radiation-polymerizable group before it is dispersed in an ionizing radiation curable resin (JP-A 2005-99778). Although silica particles are bound by the binder when cured, this method yet fails to prevent silica particles from emerging prior to curing, resulting in poor mar resistance.

For the purpose of improving mar resistance, JP-A 2007-146106 proposes to integrate hollow inorganic oxide particles with a hydrolyzate of a bissilane compound of specific structure to form a composite resin. Then hollow inorganic oxide particles can be uniformly dispersed in the cured coating without allowing hollow inorganic oxide particles to emerge afloat. The composite resin meets both mechanical strength (mar resistance) and a low refractive index (antireflection). However, curing requires a temperature above 100° C., which can cause deformation of the substrate. There is a desire for a system that does not require a temperature above 100° C. for curing.

This may be achieved by designing a photocurable system. However, acrylic or epoxy groups are necessary for photo-crosslinking. These functional groups serve to increase a refractive index. Even when hollow inorganic oxide particles are incorporated, the refractive index cannot be reduced and the reflectance cannot be reduced below a certain limit.

CITATION LIST

Patent Document 1: JP-A 2000-119634
Patent Document 2: JP-A 2004-315712
Patent Document 3: JP-A H07-133105
Patent Document 4: JP-A 2001-233611
Patent Document 5: JP-A 2002-79616
Patent Document 6: JP-A 2004-272197
Patent Document 7: JP-A 2005-266051
Patent Document 8: JP-A 2005-99778
Patent Document 9: JP-A 2007-146106

SUMMARY OF INVENTION

An object of the invention is to provide a photocurable coating composition which cures into a product having improved mar resistance and a low refractive index and is suitable in forming an antireflective film, a film-forming method, and a coated article.

The inventors have found that when a mixture of porous and/or hollow inorganic oxide fine particles, a hydrolytic condensate of an organosilicon compound comprising a bis-silane compound of specific structure, and a compound capable of generating an acid upon light exposure is held at a temperature of up to 90° C. for up to 3 minutes and illuminated with light in a dose of up to 1,000 mJ/cm², it cures into a product meeting both mechanical strength (mar resistance) and a low refractive index (antireflection) while minimizing substrate deformation. Since silanol is cured under the action of acid generated upon light illumination, the system does not require functional groups which may cause to increase a refractive index. The system also maintains a low reflectance.

Accordingly, the invention provides a photocurable coating composition, a film-forming method, and a coated article, as defined below.

One embodiment of the invention is a photocurable coating composition comprising (1) porous and/or hollow inorganic oxide fine particles (A), (2) a hydrolytic condensate of a bissilane compound (B) and/or a cohydrolytic condensate of a bissilane compound (B) and another hydrolyzable organosilicon compound (D), the bissilane compound (B) having the formula:

$$X_nR_{3-n}Si—Y—SiR_{3-n}X_n \quad (B)$$

wherein Y is a divalent organic group which may be fluorinated or a divalent organic group which may contain aromatic ring, R is a monovalent organic group, X is OH or a hydrolyzable group, and n is 1, 2 or 3, and (3) a compound capable of generating an acid upon light exposure.

Another embodiment is a photocurable coating composition comprising a composite resin which is obtained from (co)hydrolytic condensation of (2) a bissilane compound (B) or a bissilane compound (B) and another hydrolyzable organosilicon compound (D) in the presence of (1) porous and/or hollow inorganic oxide fine particles (A), the bissilane compound (B) having the formula:

$$X_nR_{3-n}Si—Y—SiR_{3-n}X_n \quad (B)$$

wherein Y is a divalent organic group which may be fluorinated or a divalent organic group which may contain aromatic ring, R is a monovalent organic group, X is OH or a hydrolyzable group, and n is 1, 2 or 3, wherein the hydrolytic condensate of component (2) is integrated with component (1) to form the composite resin, and (3) a compound capable of generating an acid upon light exposure.

In a preferred embodiment, the inorganic oxide fine particles (A) are based on $SiO_2$, and/or the inorganic oxide fine particles (A) have an average particle size of 1 to 100 nm.

In a preferred embodiment, the bissilane compound (B) has the formula:

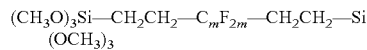

$$(CH_3O)_3Si—CH_2CH_2—C_mF_{2m}—CH_2CH_2—Si(OCH_3)_3$$

wherein m is an integer of 2 to 20.

In a preferred embodiment, component (2) is a cohydrolytic condensate of the bissilane compound (B) and a silane compound containing a fluorine-substituted perfluoroalkyl group having the formula:

$$F(CF_2)_aC_2H_4—SiR_{3-b}X_b \quad (D-1)$$

wherein R and X are as defined above, a is an integer of 1 to 12, and b is an integer of 1 to 3.

In a preferred embodiment, the (co)hydrolytic condensate as component (2) contains 3 to 12% by weight of silanol groups.

In a preferred embodiment, component (3) is an onium salt selected from the group consisting of $R^4_2I^+Z^-$, $R^4_3S^+Z^-$, $R^4_2R^5S^+Z^-$, $R^4R^5_2S^+Z^-$, $R^4—S—R^4S^+R^5_2Z^-$, $R^4_3Se^+Z^-$, $R^4_4P^+Z^-$, and $R^4_4N^+Z^-$, wherein $R^4$ is $C_6$-$C_{30}$ aryl, $R^5$ is $C_1$-$C_{30}$ alkyl, and $Z^-$ is an anion selected from the group consisting of $SbF_6^-$, $SbCl_6^-$, $AsF_6^-$, $PF_6^-$, $PF_n(Rf)_{6-n}^-$, $BF_4^-$, $B(C_6F_5)_4^-$, $HSO_4^-$, $ClO_4^-$, $Cl^-$, $HSO_4^-$ and $CF_3SO_3^-$, wherein Rf is an fluorinated alkyl group having 1 to 10 carbon atoms in which one or more hydrogen atoms of an alkyl group are replaced by fluorine atoms, and n is an integer of 0 to 5.

In a preferred embodiment, components (1) and (2) are present in a weight ratio of 10/90 to 70/30, and 0.1 to 30 parts by weight of component (3) is present relative to 100 parts by weight of components (1) and (2) combined.

The coating composition may further comprise (4) a dialkoxyanthracene in an amount of 0.01 to 5 parts by weight relative to 100 parts by weight of components (1) and (2) combined, and (5) a (co)hydrolytic condensate of a reactive dimethylsiloxane (C) and/or an organosilicon compound comprising the reactive dimethylsiloxane (C) in an amount of 1 to 25% by weight based on the solids in the coating composition, the dimethylsiloxane (C) having the formula:

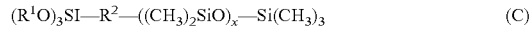

$$(R^1O)_3Si—R^2—((CH_3)_2SiO)_x—Si(CH_3)_3 \quad (C)$$

wherein $R^1$ is methyl, ethyl, propyl or butyl, $R^2$ is oxygen or $CH_2CH_2$, and x is an integer of 5 to 50.

Preferably, component (5) is a cohydrolytic condensate of the reactive dimethylsiloxane (C) and an organosilicon compound comprising the hydrolyzable silane compound (D).

Typically the coating composition is used in forming an antireflective film.

In another aspect, the invention provides a method for forming a film, comprising applying the coating composition defined above onto a substrate, holding the coating at a temperature of up to 90° C. for up to 3 minutes, and illuminating the coating with light in a dose of up to 2,000 mJ/cm².

In a further aspect, the invention provides a coated article comprising a substrate and a coating of the coating composition disposed thereon as an outermost layer. The coated article is preferably low reflective. Preferably the substrate is a transparent synthetic resin substrate.

ADVANTAGEOUS EFFECTS OF INVENTION

Since the coating composition comprises porous and/or hollow inorganic oxide fine particles, voids are present in the resin. Due to inclusion of air having the lowest refractive index, the cured product or coating has a low refractive index. Since component (1) and component (2) or hydrolytic condensate are cured with the aid of the compound capable of generating an acid upon light exposure, the cured product or coating becomes a uniform high-hardness coating without a need for treatment at or above 100° C., providing improved mar resistance and preventing substrate deformation. Accordingly, the cured product or coating is advantageously applicable to many optical articles requiring both the properties of antireflection and mar resistance including various displays such as computer displays, TV and plasma displays, polarizers in liquid crystal display devices, transparent plastic lenses, covers in various instruments, and window panes in automobiles and trains.

DESCRIPTION OF EMBODIMENTS

Component (1) is porous and/or hollow inorganic oxide fine particles which are well known in the art. A porosity or void fraction must be increased in order to provide a lower refractive index. To this end, particles of the type having a shell and a void interior or space are suitable. In this sense, the hollow particle may also be described as a particle having a void in the interior. The inorganic material may include metal oxides such as oxides of Si, Ti, Zn, Sb, Y, La, Zr, Al, In, Sn, Ce, Fe, etc. Of these, silicon base materials are preferred from the aspect of reducing the refractive index. Especially preferred are $SiO_2$ based materials, specifically consisting of 50 to 100% by weight, more specifically 80 to 100% by weight of $SiO_2$ or composite oxide of Si and another metal based on the weight of fine particles, with the balance being a further metal oxide. More preferred are $SiO_2$ based materials consisting of 50 to 100% by weight, especially 80 to 100% by weight of $SiO_2$ based on the weight of fine particles, with the balance being an oxide of any metal as mentioned above or composite oxide of Si and any metal as mentioned above.

Suitable hollow fine particles include composite oxide sols and hollow silica fine particles as disclosed in JP-A H07-133105 and JP-A 2001-233611. The hollow inorganic oxide fine particles should preferably have a refractive index in the range of 1.20 to 1.44.

Inorganic oxide fine particles preferably have an average particle size in the range of 1 to 100 nm, more preferably 5 to 80 nm, and even more preferably 10 to 60 nm. Particles with too small an average particle size may be prone to agglomerate and unstable. Particles with too large an average particle size may detract from the transparency of a cured coating. While the inorganic oxide fine particles each consist of a shell defining a void or hollow space inside, the shell desirably has a thickness of 0.1 to 30 nm, more desirably 0.5 to 20 nm. A shell which is too thin may not form a uniform layer or may be perforated, failing to provide sufficient strength, or the refractive index is reduced since voids can be filled with the resin. A shell which is too thick may fail to achieve the desired refractive index reducing effect due to a lowering of void fraction.

It is noted that the average particle size is measured by the dynamic light scattering laser Doppler method.

The inorganic oxide fine particles may be used as a dispersion in water or an organic solvent. Suitable organic solvents include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, propylene glycol monoethyl ether, and propylene glycol monomethyl ether acetate (PGMEA); ethers such as dioxane and tetrahydrofuran; ketones such as acetone, methyl ethyl ketone, methyl isobutyl ketone, cyclohexanone, and acetylacetone; esters such as ethyl acetate, butyl acetate and ethyl acetoacetate; and aromatics such as xylene and toluene.

Component (2) is an organosilicon compound. Essential of the organosilicon compound is a bissilane compound (B) having the general formula:

$$X_n R_{3-n} Si-Y-SiR_{3-n} X_n \quad (B)$$

wherein Y is a divalent organic group which may be fluorinated or a divalent organic group which may contain aromatic ring, R is a monovalent organic group, X is OH or a hydrolyzable group, and n is 1, 2 or 3.

Specifically, Y is a divalent organic group which may be fluorinated or a divalent organic group which may contain aromatic ring. Examples include divalent hydrocarbon groups of 1 to 10 carbons, especially 1 to 6 carbons, typically straight, branched or cyclic alkylene groups such as $-CH_2-$, $-C_2H_4-$, $-C_4H_8-$, $-C_6H_{12}-$ and $-C_6H_{10}-$; fluorinated divalent hydrocarbon groups of 6 to 20 carbons, especially 6 to 16 carbons, typically straight, branched or cyclic alkylene groups such as $-C_2H_4-(CF_2)$, $-C_2H_4-$, $-C_2H_4-(CF_2)_6-C_2H_4-$, $-C_2H_4-(CF_2)_8-C_2H_4-$, $-C_2H_4-(CF_2)_{10}-C_2H_4-$, $-C_2H_4-(CF_2)_{12}-C_2H_4-$ and $-C_2H_4-(CF_2)_{16}-C_2H_4-$; and aromatic ring-containing divalent hydrocarbon groups of 6 to 20 carbons, especially 6 to 10 carbons, typically arylene groups or combinations of arylene with alkylene such as $-C_6H_4-$, $-CH_2-C_6H_4-CH_2-$, and $-C_2H_4-C_6H_4-C_2H_4-$. Among others, fluorinated alkylene groups are preferred when the hardness of a cured coating and the refractive index-reducing effect are taken into account. More preferred are fluorinated divalent hydrocarbon groups having the following general formula:

$$CH_2CH_2-C_mF_{2m}-CH_2CH_2-$$

wherein m is an integer of 2 to 20. If m is 1, sufficient water repellency may not be exerted and the desired refractive index reducing effect may not be achieved. If m is in excess of 20, which leads to an insufficient crosslinking density, a cured coating may become soft and fail to provide the desired mar resistance. An economical disadvantage may also arise that the corresponding silane compound is difficult to purify because of a substantially elevated boiling point. The chain length of perfluoroalkylene moiety is more preferably in a range of 4 to 12, and even more preferably 4 to 8.

R is an organic group, examples of which include straight, branched or cyclic alkyl groups such as methyl, ethyl, butyl, hexyl and cyclohexyl, aryl groups such as phenyl, and other monovalent hydrocarbon groups, with those groups of 1 to 10 carbon atoms being preferred.

X is a OH group or a hydrolyzable group such as halogen atoms, alkoxy, acyloxy or alkenoxy groups of 1 to 4 carbons, or $-NCO$. Examples include OH groups, halogen atoms such as Cl, alkoxy groups such as methoxy, ethoxy, propoxy, isopropoxy, and butoxy, alkenoxy groups such as isopropenoxy, acyloxy groups such as acetoxy, ketoxime groups such as methylethylketoxime, alkoxyalkoxy groups such as methoxyethoxy, and $-NCO$ groups. Inter alia, alkoxy groups are preferred, and silane compounds having methoxy or ethoxy groups are more preferred because of ease of handling and ease of reaction control during hydrolysis.

The subscript n indicative of the number of siloxane crosslinkable groups X may be equal to 1, 2 or 3, and preferably equal to 2 or 3 from the standpoint of cure. For increasing the crosslinking density to provide a satisfactory level of mar resistance, n=3 is most preferred.

Examples of the bissilane compound meeting the above requirement are given below.

$(CH_3O)_3Si-C_2H_4-Si(OCH_3)_3$,
$(CH_3O)_3Si-C_6H_{12}-Si(OCH_3)_3$,
$(CH_3O)_2(CH_3)Si-C_2H_4-Si(CH_3)(OCH_3)_2$,
$(CH_3O)(CH_3)_2Si-C_2H_4-Si(CH_3)_2(OCH_3)$,
$(CH_5O)_3Si-C_2H_4-Si(C_2H_5O)_3$,
$Cl_3Si-C_2H_4-SiCl_3$,
$(C_3COO)_3Si-C_2H_4-Si(OCOCH_3)_3$,
$(CH_3O)_3Si-C_6H_4-Si(OCH_3)_3$,
$(CH_3O)_2(CH_3)Si-C_6H_4-Si(CH_3)(OCH_3)_2$,
$(CH_3O)(CH_3)_2Si-C_6H_4-Si(CH_3)_2(OCH_3)$,
$(CH_3O)_3Si-C_2H_4-C_6H_4-C_2H_4-Si(OCH_3)_3$,
$(CH_3O)_2(CH_3)Si-C_2H_4-C_6H_4-C_2H_4-Si(CH_3)(OCH_3)_2$,
$(CH_3O)(CH_3)_2Si-C_2H_4-C_6H_4-C_2H_4-Si(CH_3)_2(OCH_3)$,
$(CH_3O)_3Si-C_2H_4-(CF_2)_2-C_2H_4-Si(OCH_3)_3$,
$(CH_3O)_3Si-C_2H_4(CF_2)_4-C_2H_4-Si(OCH_3)_3$,
$(CH_3O)_3Si-C_2H_4(CF_2)_6-C_2H_4-Si(OCH_3)_3$,
$(CH_3O)_3Si-C_2H_4(CF_2)-C_2H_4-Si(OCH_3)_3$,
$(CH_3O)_3Si-C_2H_4(CF_2)_{10}-C_2H_4-Si(OCH_3)_3$,
$(CH_3O)_3Si-C_2H_4(CF_2)_{12}-C_2H_4-Si(OCH_3)_3$,
$(CH_3O)_3Si-C_2H_4(CF_2)_{16}-C_2H_4-Si(OCH_3)_3$, (CH$_3$O)$_3$Si—C$_2$H$_4$—(CF$_2$)$_{20}$—C$_2$H$_4$—Si(OCH$_3$)$_3$,
(C$_2$H$_5$O)$_3$Si—C$_2$H$_4$—(CF$_2$)$_4$—C$_2$H$_4$—Si(OC$_2$H$_5$)$_3$,
(C$_2$H$_5$O)$_3$Si—C$_2$H$_4$—(CF$_2$)$_6$—C$_2$H$_4$—Si(OC$_2$H$_5$)$_3$,
(C$_2$H$_5$O)$_3$Si—C$_2$H$_4$—(CF$_2$)$_8$—C$_2$H$_4$—Si(OC$_2$H$_5$)$_3$,
(C$_2$H$_5$O)$_3$Si—C$_2$H$_4$—(CF$_2$)$_{10}$—C$_2$H$_4$—Si(OC$_2$H$_5$)$_3$,
(C$_2$H$_5$O)$_3$Si—C$_2$H$_4$—(CF$_2$)$_{12}$—C$_2$H$_4$—Si(OC$_2$H$_5$)$_3$,
(C$_2$H$_5$O)$_3$Si—C$_2$H$_4$—(CF$_2$)$_{16}$—C$_2$H$_4$—Si(OC$_2$H$_5$)$_3$,
(C$_2$H$_5$O)$_3$Si—C$_2$H$_4$—(CF$_2$)$_{20}$—C$_2$H$_4$—Si(OC$_2$H$_5$)$_3$,
(C$_3$H$_7$O)$_3$Si—C$_2$H$_4$—(CF$_2$)$_4$—C$_2$H$_4$—Si(OC$_3$H$_7$)$_3$,
(C$_3$H$_7$O)$_3$Si—C$_2$H$_4$—(CF$_2$)$_6$—C$_2$H$_4$—Si(OC$_3$H$_7$)$_3$,
(C$_3$H$_7$O)$_3$Si—C$_2$H$_4$—(CF$_2$)$_8$—C$_2$H$_4$—Si(OC$_3$H$_7$)$_3$,
(CH$_3$O)$_2$(CH$_3$)Si—C$_2$H$_4$—(CF$_2$)$_4$—C$_2$H$_4$—Si(CH$_3$)(OCH$_3$)$_2$,
(CH$_3$O)$_2$(CH$_3$)Si—C$_2$H$_4$—(CF$_2$)$_6$—C$_2$H$_4$—Si(CHO)(OCH$_3$)$_2$,
(CH$_3$O)$_2$(C$_6$H$_5$)Si—C$_2$H$_4$—(CF$_2$)$_4$—C$_2$H$_4$—Si(C$_6$H$_5$)(OCH$_3$)$_2$, and
(CH$_3$O)$_2$(C$_6$H$_5$)Si—C$_2$H$_4$—(CF$_2$)$_6$—C$_2$H$_4$—Si(C$_6$H$_5$)(OCH$_3$)$_2$.

Of these, preferred are the following bissilane compounds:
(CH$_3$O)$_3$Si—C$_2$H$_4$—(CF$_2$)$_4$—C$_2$H$_4$—Si(OCH$_3$)$_3$,
(CH$_3$O)$_3$Si—C$_2$H$_4$—(CF$_2$)$_6$—C$_2$H$_4$—Si(OCH$_3$)$_3$,
(CH$_3$O)$_3$Si—C$_2$H$_4$—(CF$_2$)$_8$—C$_2$H$_4$—Si(OCH$_3$)$_3$,
and those compounds of the same formulae wherein methoxy is replaced by ethoxy.

Component (2), the organosilicon compound comprising the bissilane compound (B) may further comprise another hydrolyzable organosilicon compound. That is, the bissilane compound (B) and the other hydrolyzable organosilicon compound may be subjected to cohydrolytic condensation. Reference is now made to the organosilicon compound which is cohydrolyzable with the bissilane compound. The following organosilicon compound may be used in combination with the bissilane compound as long as the desired properties are not compromised. Suitable organosilicon compounds include monosilanes, for example, silicates such as tetraethoxysilane, epoxy-functional alkoxysilanes such as γ-glycidoxypropyltrimethoxysilane and 3,4-epoxycyclohexyltrimethoxysilane, amino-functional alkoxysilanes such as γ-aminopropyltriethoxysilane, (meth)acrylic-functional alkoxysilanes such as γ-(meth)acryloxypropyltrimethoxysilane, mercapto-functional alkoxysilanes such as γ-mercaptopropyltrimethoxysilane, alkylalkoxysilanes such as methyltrimethoxysilane, hexyltrimethoxysilane and decyltrimethoxysilane, phenylalkoxysilanes such as phenyltrimethoxysilane, halogen-substituted alkylalkoxysilanes such as chloropropyltrimethoxysilane, trifluoropropyltrimethoxysilane, perfluorobutylethyltrimethoxysilane, and perfluorooctylethyltrimethoxysilane, alkoxysilanes having a fluorinated substituent group such as CF$_3$(CF$_2$)$_7$SO$_2$NH—C$_3$H$_3$—Si(OCH$_3$)$_3$, CF$_3$(CF$_2$)$_7$CONH—C$_3$H$_6$—Si(OCH$_3$)$_3$, and perfluoropolyether-containing methoxysilane, and derivatives thereof.

Of the foregoing silane compounds, the silane compounds having a fluorine-substituted perfluoroalkyl group are preferred because they are effective for reducing refractive index and improving alkali resistance. These silane compounds have the general formula (D-1):

$$F(CF_2)_aC_2H_4—SiR_{3-b}X_b \quad (D-1)$$

wherein R and X are as defined above, a is an integer of 1 to 12, and b is an integer of 1 to 3. The subscript "a" indicative of the chain length of perfluoroalkyl moiety is an integer of 1 to 12, preferably 4 to 12, and more preferably 4, 6, 8, 10 or 12. If the value of a is too low, a cured coating may lose alkali resistance due to a low fluorine content. The subscript "b" indicative of the number of siloxane crosslinkable groups X is preferably equal to 2 or 3. For increasing the crosslinking density to provide a satisfactory level of mar resistance, b=3 is most preferred.

Examples of the hydrolyzable silane compound having a fluorine-substituted organic group include the following, but are not limited thereto.
CF$_3$(CF$_2$)$_3$C$_2$H$_4$—Si(OCH$_3$)$_3$,
CF$_3$(CF$_2$)$_3$C$_2$H$_4$—Si(OC$_2$H$_3$)$_3$,
CF$_3$(CF$_2$)$_3$C$_2$H$_4$—Si(CH$_3$)(OCH$_3$)$_2$,
CF$_3$(CF$_2$)$_5$C$_2$H$_4$—Si(OCH$_3$)$_3$,
CF$_3$(CF$_2$)$_7$C$_2$H$_4$—Si(OCH$_3$)$_3$,
CF$_3$(CF$_2$)$_7$C$_2$H$_4$—Si(OC$_2$H$_5$)$_3$,
CF$_3$(CF$_2$)$_7$C$_2$H$_4$—Si(CH$_3$)(OCH$_3$)$_2$,
CF$_3$(CF$_2$)$_9$C$_2$H$_4$—Si(OCH$_3$)$_3$, and
CF$_3$(CF$_2$)C$_2$H$_4$—Si(OCH$_3$)$_3$.

Of the foregoing examples, CF$_3$(CF$_2$)$_5$C$_2$H$_4$—Si(OCH$_3$)$_3$ is most preferred.

Hydrolyzable organopolysiloxane compounds having dimethylsiloxane chain may also be used in combination because they are effective for improving slippage and anti-staining on the surface. However, if dimethylsiloxane chain is incorporated into the structure, the coating becomes soft. Thus organopolysiloxane compounds having a reactive moiety only at one end are preferred. The preferred organopolysiloxane compounds have the general formula (C):

$$(R^1O)_3Si—R^2—((CH_3)_2SiO)_x—Si(CH_3)_3 \quad (C)$$

wherein R$^1$ is methyl, ethyl, propyl or butyl, R$^2$ is oxygen or CH$_2$CH$_2$, and x is an integer of 5 to 50. The chain length of dimethylsiloxane chain is preferably 5 to 50, more preferably 7 to 30. If the chain length is shorter than the range, slippage and anti-staining may be insufficient. If the chain length is longer than the range, a coating may have poor mar resistance.

The cohydrolyzable organosilicon compounds may be used alone or in admixture of two or more.

The bissilane compound (B) and the cohydrolyzable organosilicon compound (D) are preferably used in a weight ratio B/D of from 50/50 to 100/0, more preferably from 75/25 to 100/0. When compound (D) is used, the ratio B/D is up to 99/1. Too large an amount of the cohydrolyzable organosilicon compound (D) may lead to a lowering of crosslinking density, failing to provide mar resistance.

It is preferred that the amount of a hydrophilic silane compound such as an alkyl silicate, epoxy-functional silane, (meth)acrylic functional silane, mercapto-functional silane or amino-functional silane be lower. Specifically, the amount of a hydrophilic silane compound is preferably up to 10% by weight, more preferably up to 1% by weight of the cohydrolyzable organosilicon compound (D). It should be avoided to blend the hydrophilic silane compound in an amount beyond the range because the surface of a cured product or coating would otherwise become wettable with a water-soluble alkaline substance, and degraded by the alkaline attack.

Hydrolytic condensation may be effected by any prior art well-known techniques.

A catalyst may be used upon hydrolytic condensation. Examples of the catalyst used herein include acids such as hydrochloric acid, nitric acid, acetic acid and maleic acid, alkali metal hydroxides such as NaOH and KOH, amine compounds such as ammonia, triethylamine, dibutylamine, hexylamine, and octylamine, salts of amine compounds, bases including quaternary ammonium salts such as benzyltriethylammonium chloride, tetramethylammonium hydroxide, and tetrabutylammonium hydroxide, fluoride salts such as potassium fluoride and sodium fluoride; solid acidic catalysts and solid basic catalysts (e.g., ion exchange resin catalysts); organometallic compounds, for example, metal salts of organic carboxylic acids such as iron 2-ethylhexoate, titanium naphthate, zinc stearate, and dibutyltin diacetate, organic titanium esters such as tetrabutoxytitanium, tetraisopropoxytitanium, dibutoxy(bis-2,4-pentanedionate)titanium and diisopropoxy(bis-2,4-pentanedionate)titanium, organic zirconium esters such as tetrabutoxyzirconium, tetraisopropoxyzirconium, dibutoxy(bis-2,4-pentanedionate)zirconium and diisopropoxy(bis-2,4-pentanedionate)zirconium, alkoxyaluminum compounds such as aluminum triisopropoxide, aluminum chelates such as aluminum acetylacetonate; aminoalkyl-substituted alkoxysilanes such as γ-aminopropyltrimethoxysilane, γ-aminopropyltriethoxysilane, N—(β-aminoethyl)-γ-aminopropyltrimethoxysilane, and N—(β-aminoethyl)-γ-aminopropyltriethoxysilane. These catalysts may be used alone or in admixture.

An appropriate amount of the catalyst added is 0.01 to 10 parts by weight, preferably 0.1 to 5 parts by weight relative to 100 parts by weight of the organosilicon compound. With less than 0.01 pbw of the catalyst, a long time may be taken until the completion of reaction or the reaction may be retarded. More than 10 pbw of the catalyst is not only uneconomical, but also may raise problems including colored reaction product, more side reactions, and unstable reaction system.

It is recommended that hydrolytic condensation be performed in a system diluted with an organic solvent. Suitable organic solvents include alcohols such as methanol, ethanol, propyl alcohol, isopropyl alcohol, n-butyl alcohol, isobutyl alcohol, sec-butyl alcohol, t-butyl alcohol and diacetone alcohol; glycol ethers such as ethylene glycol monomethyl ether, ethylene glycol monoethyl ether, propylene glycol monomethyl ether, propylene glycol monoethyl ether, and propylene glycol monomethyl ether acetate (PGMEA); ethers such as dioxane and tetrahydrofuran; ketones such as acetone, methyl ethyl ketone, methyl isobutyl ketone, cyclohexanone, and acetylacetone; esters such as ethyl acetate, butyl acetate and ethyl acetoacetate; xylene and toluene. Although the organic solvent may be added in any desired amount, it is preferably added so as to form a solution having a concentration of 0.5 to 50% by weight, more preferably 1 to 30% by weight of effective components.

Hydrolytic condensation may be performed by dispersing and mixing porous and/or hollow inorganic oxide fine particles (A) and an organosilicon compound comprising a bissilane compound in an organic solvent, adding a catalyst thereto if desired, and adding water thereto for hydrolysis. The amount of water used for hydrolysis may be 0.3 to 10 moles of water per mole of total hydrolyzable groups (SiX) in the entire organosilicon compound. On this basis, less amounts of water have a likelihood that neither hydrolysis nor crosslinking between inorganic fine particles and a binder derived from the organosilicon compound may take place to a sufficient extent. Larger amounts of water have a likelihood that upon application of a coating solution prepared from the resulting hydrolytic condensate, the coating is whitened because the residual water is not fully volatilized off. More preferably water for hydrolysis is used in an amount of 0.5 to 5 moles per mole of total hydrolyzable groups. With respect to the mode of addition of the organosilicon compound, the entire amount may be hydrolyzed at a time in the presence of inorganic oxide particles, or the organosilicon compound may be added in divided portions for multiple stages of hydrolysis.

The hydrolytic condensate should have silanol groups so that crosslinking may be induced by component (3). The content of silanol groups is preferably 3 to 12% by weight of the hydrolytic condensate as component (2). Less than 3 wt % of silanol groups may lead to insufficient crosslinking to provide mar resistance. More than 12 wt % of silanol groups may lead to insufficient binding of component (1), failing to provide mar resistance or losing transparency.

Component (1), porous and/or hollow inorganic oxide fine particles (A) and component (2), hydrolytic condensate are preferably present in a weight ratio (1)/(2) of from 10/90 to 70/30. Outside the range, larger amounts of component (2) may be detrimental to the refractive index-reducing effect, failing to provide antireflection. Less amounts of component (2) indicate relative shortage of binder and insufficient binding of inorganic oxide particles, failing to provide a satisfactory level of mar resistance. The weight ratio (1)/(2) is more preferably from 20/80 to 50/50, and even more preferably from 30/70 to 45/55.

Any hydrolyzable metal compounds may be used in combination insofar as they do not adversely affect mar resistance and low refractive index (or antireflection). Suitable hydrolyzable metal compounds include, but are not limited to, organic titanium esters such as tetrabutoxytitanium, tetraisopropoxytitanium, dibutoxy(bis-2,4-pentanedionate)titanium, and diisopropoxy(bis-2,4-pentanedionate)titanium; organic zirconium esters such as tetrabutoxyzirconium, tetraisopropoxyzirconium, dibutoxy(bis-2,4-pentanedionate)zirconium, and diisopropoxy(bis-2,4-pentanedionate)zirconium, alkoxyaluminum compounds such as aluminum triisopropoxide, aluminum chelates such as aluminum acetylacetonate; hydrolyzable derivatives of Hf, V, Nb, Ta, Mo, W, Fe, Ru, Co, Rh, Ni, Zn, Ga, In, Ge, Sn, etc. Particularly when chemical resistance is of interest, derivatives of such metals as Zr and Hf may be used in combination.

In a preferred embodiment, an organosilane compound comprising a bissilane compound (B) is hydrolyzed and condensed in the presence of porous and/or hollow inorganic oxide fine particles (A), whereby the two components are integrated together to form a composite resin. The composite is advantageous in that hollow inorganic oxide fine particles are uniformly dispersed in the cured coating without the risk of the particles emerging afloat on the surface.

Component (3) is a compound capable of generating an acid upon light exposure. It is generally known as photoacid generator. The photoacid generator generates an acid upon light exposure, whereupon the acid facilitates condensation of silanol groups and hydrolytic condensation of alkoxy groups in components (1) and (2) and crosslinking therebetween, eventually forming a robust film.

Suitable photoacid generators used herein include onium salts, for example, diaryl iodonium salts, triaryl sulfonium salts, monoaryl dialkyl sulfonium salts, triaryl selenonium salts, tetraaryl phosphonium salts, and aryl diazonium salts, having the following formulae:

$R^4_2I^+Z^-$, $R^4_3S^+Z^-$, $R^4_2R^5S^+Z^-$, $R^4R^5_2S^+Z^-$, $R^4-S-R^4S^+R^5_2Z^-$, $R^4_3Se^+Z^-$, $R^4_4P^+Z^-$, and $R^4N_2^+Z^-$, respectively, wherein $R^4$ is $C_6$-$C_{30}$ aryl, $R^5$ is $C_1$-$C_{30}$ alkyl, and $Z^-$ is an anion selected from the group consisting of $SbF_6^-$, $SbCl_6^-$, $AsF_6^-$, $PF_6^-$, $PF_n(Rf)_{6-n}^-$, $BF_4^-$, $B(C_6F_5)_4^-$ $HSO_4^-$, $ClO_4^-$, $Cl^-$, $HSO_4^-$ and $CF_3SO_3^-$, wherein Rf is an fluorinated alkyl group having 1 to 10 carbon atoms in which one or more hydrogen atoms of an alkyl group are replaced by fluorine atoms, and n is an integer of 0 to 5.

Illustrative examples of onium salts are given below.

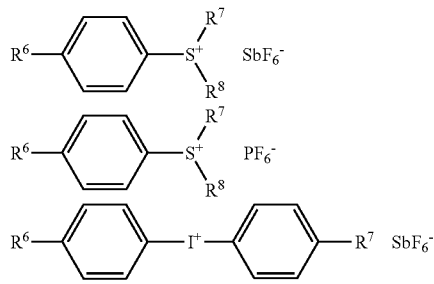

$R^6=R^7=R^8=C_{10}H_{21}$ to $C_{14}H_{29}$

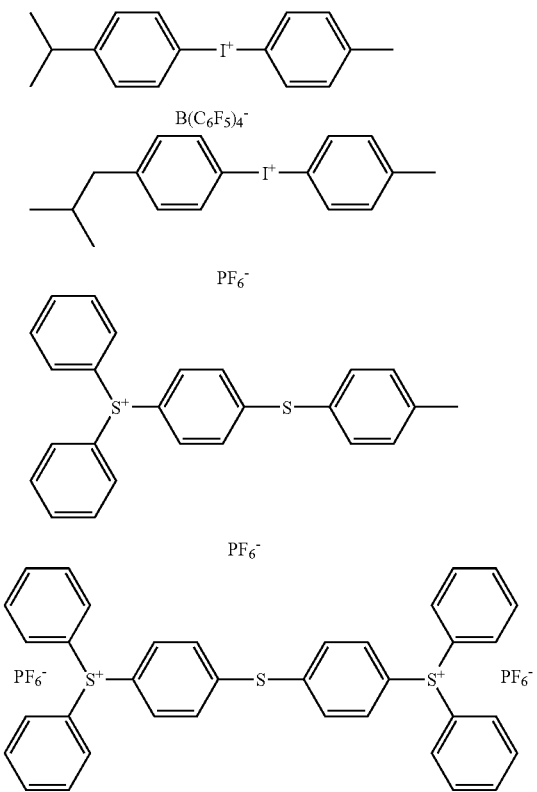

An appropriate amount of the photoacid generator (3) added may generally be 0.1 to 30 parts by weight, preferably 0.5 to 20 parts by weight relative to 100 parts by weight of components (1) and (2) combined. Outside the range, less amounts of the photoacid generator may facilitate crosslinking insufficiently, resulting in poor mar resistance. Larger amounts of the photoacid generator are disadvantageous in economy because any effect corresponding the increment may not be observable and the optical properties of a coating may be adversely affected.

If desired, the composition may further comprise an organic solvent. The organic solvent used herein must meet that components (1) to (3) dissolve therein. Suitable organic solvents include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, propylene glycol monoethyl ether, and propylene glycol monomethyl ether acetate (PGMEA); ethers such as dioxane and tetrahydrofuran; ketones such as acetone, methyl ethyl ketone, methyl isobutyl ketone, cyclohexanone, and acetylacetone; esters such as ethyl acetate, butyl acetate and ethyl acetoacetate; xylene and toluene. These organic solvents may be used alone or in admixture of two or more.

The organic solvent is preferably added so as to form a solution having a concentration of 0.5 to 50% by weight, more preferably 1 to 30% by weight of effective components (1) to (3). In the embodiment wherein the coating is used as an antireflective film, the coating should be as thin as about 100 nm, and to this end, the solution should preferably have a concentration of 1 to 10% by weight.

The photocurable coating composition of the invention may further comprise (4) a dialkoxyanthracene for the purpose of facilitating silanol crosslinking and improving mar resistance. Exemplary dialkoxyanthracenes include 9,10-diethoxyanthracene, 9,10-di-n-propoxyanthracene, 9,10-di-n-butoxyanthracene, 2-ethyl-9,10-diethoxyanthracene, 2-ethyl-9,10-di-n-propoxyanthracene, 2-ethyl-9,10-di-n-butoxyanthracene, 9,10-bis(2-ethylhexyloxy)anthracene, 9,10-bis(2-methylhexyloxy)anthracene, 9,10-bis(2-propylhexyloxy)anthracene, and 9,10-bis(2-butylhexyloxy)anthracene. Inter alia, 9,10-di-n-butoxyanthracene is most preferred.

An appropriate amount of the dialkoxyanthracene added is 0.01 to 5 parts by weight, more preferably 0.05 to 3 parts by weight relative to 100 parts by weight of components (1) and (2) combined. Less amounts of dialkoxyanthracene may fail to achieve the desired effect. Larger amounts of dialkoxyanthracene are disadvantageous in economy because any effect corresponding the increment may not be observable and the optical properties of a coating may be adversely affected.

Also preferably, a silicon or fluorine-containing surfactant is added to the photocurable coating composition. The inclusion of such surfactants improves anti-staining properties, provides a coating surface from which aqueous and/or oily paint, marker ink, fatty stains, typically fingerprints, oily stains, and aqueous stains can be readily removed, and permits the anti-staining effect to last long.

Suitable surfactants include dimethylsiloxane compounds, polyether-modified silicone compounds, commercially available fluorochemical surfactants such as Fluorad® from 3M, fluoroalkylpolyethers from DuPont, and Surflon® from Asahi Glass Co., Ltd., and SiOH-terminated oligomers resulting from hydrolytic condensation of perfluorosilane alone.

Among these, compounds having silanol or alkoxy groups are advantageous in durability because they can be crosslinked at the same time when components (1) and (2) are crosslinked under the action of component (3).

The coating composition is endowed with better anti-staining property when it further comprises (5) a (co)hydrolytic condensate of a reactive dimethylsiloxane (C) and/or an organosilicon compound comprising the reactive dimethylsiloxane (C).

$$(R^1O)_3Si-R^2-((CH_3)_2SiO)_x-Si(CH_3)_3 \qquad (C)$$

Herein $R^1$ is methyl, ethyl, propyl or butyl, $R^2$ is oxygen or $CH_2CH_2$, and x is an integer of 5 to 50.

Since the reactive dimethylsiloxane (C) or the hydrolyzate comprising the same tends to bleed on the surface, it is convenient to endow the surface with anti-staining property. Since it has a reactive group only at one end, it is not incorporated into the structure, and the risk of adversely affecting mar resistance is minimized.

Preferably, $R^1$ is methyl or ethyl, and x is an integer of 10 to 30.

In combination with dimethylsiloxane (C), another silane compound may be used so that they may be subjected to cohydrolytic condensation. The silane compounds which can be used along with dimethylsiloxane (C) may be the same as the hydrolyzable silane compounds exemplified as component (D), and include silicates such as tetraethoxysilane, epoxy-functional alkoxysilanes such as γ-glycidoxypropyltrimethoxysilane and 3,4-epoxycyclohexyltrimethoxysilane, amino-functional alkoxysilanes such as γ-aminopropyltriethoxysilane, (meth)acrylic-functional alkoxysilanes such as γ-(meth)acryloxypropyltrimethoxysilane, mercapto-functional alkoxysilanes such as γ-mercaptopropyltrimethoxysilane, alkylalkoxysilanes such as methyltrimethoxysilane, hexyltrimethoxysilane and decyltrimethoxysilane, phenylalkoxysilanes such as phenyltrimethoxysilane, halogen-substituted alkylalkoxysilanes such as chloropropyltrimethoxysilane, trifluoropropyltrimethoxysilane, perfluorobutylethyltrimethoxysilane, and perfluorooctylethyltrimethoxysilane, alkoxysilanes having a fluorinated substituent group such as $CF_3(CF_2)_7SO_2NH-C_3H_6-Si(OCH_3)_3$, $CF_3(CF_2)_7CONH-C_3H_6-Si(OCH_3)_3$, and perfluoropolyether-containing methoxysilane, and derivatives thereof.

The preferred compounds are a dimethylsiloxane of the average compositional formula: $(CH_3O)_3SiO-[(CH_3)_2SiO]_9-Si(CH_3)_3$, a hydrolyzate thereof, and a cohydrolyzate of the dimethylsiloxane and a silane of formula (D-1).

In the case of cohydrolytic condensation of a reactive dimethylpolysiloxane and a silane compound, the dimethylpolysiloxane and the silane compound are mixed in a weight ratio of from 10:90 to 90:10.

Hydrolytic condensation may be performed by the same technique as used in the hydrolytic condensation of component (2).

An amount of the (co)hydrolytic condensate (5) added may be 1 to 25% by weight based on the solids in the coating composition, which range is also effective in achieving leveling property upon coating. Less than 1 wt % may fail to provide the desired anti-staining effect whereas more than 25 wt % may adversely affect mar resistance.

To the coating composition as formulated above, other optional components may be added, for example, organic or inorganic UV absorbers, and buffer agents for controlling the pH of the system to the range of pH 2 to 7 where silanol groups are kept stable, such as acetic acid/sodium acetate and disodium hydrogenphosphate/citric acid.

The coating composition of the invention is coated and cured to a substrate surface to form a coating, typically optical film. For antireflection, the film is generally controlled to a thickness of 0.01 to 0.5 μm. An optical film having a thickness of 0.05 to 0.3 μm is more antireflective. The method of coating the composition to the surface of a substrate is not particularly limited and any of dipping, spin coating, flow coating, roll coating, spray coating and screen printing methods may be used. Among others, the dipping, spraying and roll coating methods are preferably employed so as to provide a predetermined thickness because these methods are easy to control the coating thickness.

The substrate to be coated with the coating composition is not particularly limited. Better results are obtained when the coating composition is applied to transparent substrates of synthetic resins. Suitable synthetic resins are those having good optical properties and include, but are not limited to, polycarbonate resins, polyalkylene terephthalate resins such as polyethylene terephthalate (PET), cellulose resins such as diacetylcellulose, cellulose acetate butyrate and triacetylcellulose, acrylic resins, polystyrene resins, polyimide resins, polyester resins, polyether sulfone resins, liquid crystalline resins such as polyarylate resins, polyurethane resins, polysulfone resins, polyetherketone resins, trimethylpentene, polyvinylnorbornene, polyolefin resins such as ring structure-containing polyolefin resins, and composite resins thereof. Inter alia, polycarbonate resins, polyalkylene terephthalate resins such as PET, triacetylcellulose, acrylic resins, and polyolefin resins are preferred. The transparent substrate may take the form of a molded part, plate or film. The film substrate is more preferred because of ease of coating operation.

For curing a coating, the solvent is volatilized off before the coating is illuminated with light. Preferably the solvent will volatilize off if the coating is allowed to stand at a temperature not higher than 90° C. for up to 3 minutes and more preferably at a temperature of 40 to 80° C. for 30 seconds to 2 minutes. Thereafter, light is illuminated for curing, using a high-pressure mercury lamp, metal halide lamp or xenon lamp. An appropriate exposure dose is up to 2,000 $mJ/cm^2$, more preferably up to 1,000 $mJ/cm^2$, and also preferably at least 200 $mJ/cm^2$.

Volatilization of the solvent should preferably be at a temperature below the heat distortion temperature of the substrate because the substrate would otherwise be deformed or curled.

Once the cured coating is formed on the substrate surface from the coating composition of the invention, it may be overlaid with any desired oil repellent anti-staining film. Differently stated, the coated article which serves as an antireflective part may be further provided with an oil repellent anti-staining film for the purposes of preventing oily stains such as fingerprints from sticking (as often found during service of the antireflective part) and permitting the once applied stains to be readily removed or wiped off.

Before the cured coating is formed on the substrate surface from the coating composition of the invention, the substrate may be provided with one or more functional layers such as a hard protective film for improving mar resistance, a high refractive index film for improving antireflection, and an electro-conductive film for preventing dust deposition or for antistatic purpose. As a result, the functional layer is disposed between the substrate and the cured coating.

When the transparent substrate coated with the coating composition is used as an antireflective part having mar resistance and chemical resistance, it may be attached to another transparent support. To use the coated substrate as attached to another support, any of prior art well-known acrylic, epoxy, polyimide or silicone adhesives or pressure-sensitive adhesives may be applied to the surface of the substrate which is remote from the coated surface. Inter alia, acrylic and silicone adhesives are preferred. The adhesive layer preferably has a thickness in the range of 1 to 500 μm. Too thin a layer may fail to provide a bonding force whereas too thick a layer may be uneconomical. Furthermore, a protective plastic sheet may be provided on the entire structure for surface protection.

EXAMPLE

Synthesis Examples, Examples and Comparative Examples are given below for further illustrating the invention although the invention is not limited thereto.

Synthesis Example 1

A flask equipped with a stirrer, condenser and thermometer was charged with 100 g of a bissilane compound (A), shown below, and 1 g of a cation exchange resin, which were stirred and mixed at 25° C. To the flask 40 g of water was added dropwise over 10 minutes. The contents were stirred at 40° C. for 6 hours until hydrolytic condensation terminated. To the flask was added 200 g of a hollow silica nano-particle sol (dispersion of hollow silica particles with an average particle size of 60 nm and a shell thickness of 10 nm in isopropanol in a silica concentration of 20%). The solution was diluted with ethanol to a nonvolatile content of 4%, the cation exchange resin was filtered off, and 0.1 g of polyether-modified silicone was added, yielding a coating solution (1).

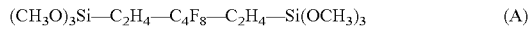

$$(CH_3O)_3Si-C_2H_4-C_4F_8-C_2H_4-Si(OCH_3)_3 \qquad (A)$$

Synthesis Example 2

A flask equipped with a stirrer, condenser and thermometer was charged with 100 g of the bissilane compound (A), used in Synthesis Example 1, 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone was added, yielding a coating solution (2).

Synthesis Example 3

A coating solution (3) was prepared as in Synthesis Example 2 except that a silane compound (B) was used instead of the silane compound (A).

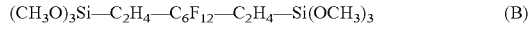

$$(CH_3O)_3Si-C_2H_4-C_6F_{12}-C_2H_4-Si(OCH_3)_3 \qquad (B)$$

Synthesis Example 4

A coating solution (4) was prepared as in Synthesis Example 2 except that a silane compound (C) was used instead of the silane compound (A).

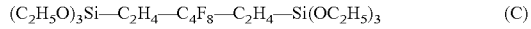

$$(C_2H_5O)_3Si-C_2H_4-C_4F_8-C_2H_4-Si(OC_2H_5)_3 \qquad (C)$$

Synthesis Example 5

A flask equipped with a stirrer, condenser and thermometer was charged with 100 g of the bissilane compound (A), used in Synthesis Example 1, 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone and 0.2 g of aluminum acetoacetate were added, yielding a coating solution (5).

Synthesis Example 6

A flask equipped with a stirrer, condenser and thermometer was charged with 100 g of the bissilane compound (A), used in Synthesis Example 1, 5 g of a fluorinated organic group-containing organosilicon compound (i), 1 g of a dimethylsiloxane chain-containing silane compound (ii), shown below, 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone was added, yielding a coating solution (6).

$$CF_3(CF_2)_5C_2H_4-Si(OCH_3)_3 \qquad (i)$$

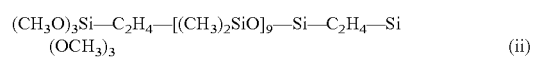

$$(CH_3O)_3Si-C_2H_4-[(CH_3)_2SiO]_9-Si-C_2H_4-Si(OCH_3)_3 \qquad (ii)$$

(average compositional formula)

Synthesis Example 7

A flask equipped with a stirrer, condenser and thermometer was charged with 100 g of the bissilane compound (A), used in Synthesis Example 1, 5 g of the fluorinated organic group-containing organosilicon compound (i), 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone was added, yielding a coating solution (7).

Synthesis Example 8

A flask equipped with a stirrer, condenser and thermometer was charged with 100 g of the bissilane compound (A), used in Synthesis Example 1, 1 g of the dimethylsiloxane chain-containing silane compound (ii), 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone was added, yielding a coating solution (8).

Comparative Synthesis Example 1

A flask equipped with a stirrer, condenser and thermometer was charged with 100 g of the bissilane compound (A), used in Synthesis Example 1, 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone and 1 g of aluminum acetoacetate were added, yielding a coating solution (9).

Comparative Synthesis Example 2

A flask equipped with a stirrer, condenser and thermometer was charged with 100 g of the bissilane compound (A), used in Synthesis Example 1, 200 g of a silica nano-particle sol (dispersion of silica particles with an average particle size of 15 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone was added, yielding a coating solution (10).

Comparative Synthesis Example 3

A flask equipped with a stirrer, condenser and thermometer was charged with 100 g of tetraethoxysilane, 200 g of a hollow silica nano-particle sol (dispersion of hollow silica particles with an average particle size of 60 nm and a shell thickness of 10 nm in isopropanol in a silica concentration of 20%), and 1 g of a cation exchange resin, which were stirred and mixed at 25° C. To the flask 40 g of water was added dropwise over 10 minutes. The contents were stirred at 40° C. for 6 hours until hydrolytic condensation terminated. The solution was diluted with ethanol to a nonvolatile content of 4%, the cation exchange resin was filtered off, and 0.1 g of polyether-modified silicone was added, yielding a coating solution (11).

Synthesis Example A

A flask equipped with a stirrer, condenser and thermometer was charged with 50 g of a reactive dimethylsiloxane (D), shown below, 100 g of trifluoropropyltrimethoxysilane, 100 g of t-butanol, 20 g of methanol, 1 g of a cation exchange resin, and 1 g of aluminum acetoacetate. The contents were stirred at 40° C. for 3 hours to effect hydrolytic condensation. The cation exchange resin was filtered off. An anti-staining agent (A) was synthesized.

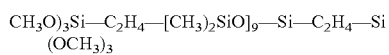   (D)

(average compositional formula)

Synthesis Example B

An anti-staining agent (B) was synthesized as in Synthesis Example A aside from using a siloxane compound (E) instead of the siloxane compound (D).

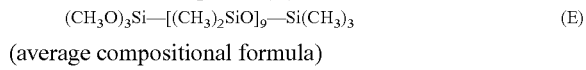   (E)

(average compositional formula)

Examples and Comparative Examples

Coating compositions were prepared by combining the components obtained in the foregoing Synthesis Examples, photoacid generator (F) or (G), and other components in accordance with the formulation shown in Tables 1 to 3. The compositions were tested for properties, with the results also shown in Tables 1 to 3.

Coating Method

On a polycarbonate substrate whose surface had been cleaned and treated with an acrylic hardcoat, the following layers were sequentially coated by a bar coater #3 so as to give a predetermined thickness and cured.

(I) High Refractive Index Layer

A silicone base coating agent X-12-2491 (Shin-Etsu Chemical Co., Ltd.), which forms a cured film having a refractive index of 1.68, was coated by a bar coater #3 so as to give a cured thickness of 0.1 μm. The coating was held in a hot air circulating oven at 80° C. for 1 minute and illuminated under a high-pressure mercury lamp in a dose of 300 mJ/cm$^2$ whereby it was cured.

(II) Cured Film of Inventive Coating Composition

After formation of layer (I), the coating composition was coated by a bar coater #3. In an experiment, the reflectance of cured coatings having a thickness of approximately 0.1 μm was measured using a spectrophotometer, and an optical film thickness ensuring that the reflectance is the lowest in the wavelength range of 500 to 600 nm was determined. The coating thickness was adjusted so as to provide the optical film thickness. After application, the coating was held in a hot air circulating oven at 80° C. for 1 minute and illuminated under a high-pressure mercury lamp in a dose of 300 mJ/cm$^2$ whereby it was cured. In Comparative Example 2, after application, the coating was held in a hot air circulating oven at 80° C. for 1 minute whereby it was cured.

Mar Resistance

In Mode-1 mar resistance test, a reciprocal scratch tester (KNT K.K.) was used. Steel wool #0000 was mounted on the tester and moved ten back-and-forth strokes across the film under a load of 500 g/cm$^2$. The number of scratches was counted.

Evaluation Criterion

| Scratches | Rating |
|---|---|
| 0 | ⊚ |
| 1-2 | ○ |
| 3-5 | Δ |
| 5 or more | X |

Chemical Resistance

One droplet of 0.1 N (0.4%) NaOH aqueous solution was dispensed on the film and held one day. The chemical was removed, after which the surface state was visually observed.

Evaluation Criterion

| intact | ○ |
|---|---|
| marks left | Δ |
| film dissolved | X |

Antireflection

The reflectance of the film was measured using a spectrophotometer. The reflectance value which is the lowest in the wavelength range of 500 to 600 nm is reported as minimum reflectance.

Anti-Staining

Fingerprints were marked to the film surface and then wiped by rubbing the film surface with tissue paper ten back-and-forth strokes. The degree of remaining stain was observed for evaluating anti-staining property.

Evaluation Criterion

| no marks | ○ |
| some marks left | Δ |
| most marks left | X |

Oil Repellency

A contact angle with oleic acid was measured according to JIS R 3257 (1999).

Deformation

Deformation of a film was judged by observing whether the film edge was curled upward.

Evaluation Criterion

| no or little curl | ○ |
| curl | X |

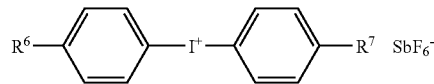

(F)

$R^6 = R^7 = C_{10}H_{21}$ to $C_{14}H_{29}$

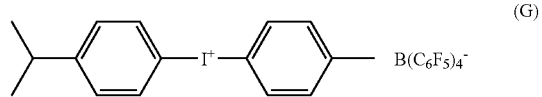

(G)

TABLE 1

| Component (pbw) | Example 1 | 2 | 3 | 4 | 5 | 6 |
|---|---|---|---|---|---|---|
| Coating solution (1) | 100 | | | | | |
| Coating solution (2) | | 100 | 100 | 100 | 100 | 100 |
| Coating solution (3) | | | | | | |
| Coating solution (4) | | | | | | |
| Coating solution (5) | | | | | | |
| Coating solution (6) | | | | | | |
| Coating solution (7) | | | | | | |
| Coating solution (8) | | | | | | |
| Coating solution (9) | | | | | | |
| Coating solution (10) | | | | | | |
| Coating solution (11) | | | | | | |
| Compound of formula (E) | | | | | 0.1 | |
| Anti-staining agent A | | | | | | 0.5 |
| Anti-staining agent B | | | | | | |
| Photoacid generator (F) | 0.1 | 0.1 | | | | |
| Photoacid generator (G) | | | 0.1 | 0.1 | 0.1 | 0.1 |
| Dibutoxyanthracene | | | | 0.01 | 0.01 | 0.01 |
| Mar resistance | ○-Δ | ○ | ○ | ⊚-○ | ⊚-○ | ○-Δ |
| Chemical resistance | ○ | ○ | ○ | ○ | ○ | ○ |
| Antireflection (%) | 0.1 | 0.1 | 0.1 | 0.1 | 0.1 | 0.1 |
| Anti-staining | ○-Δ | ○-Δ | ○-Δ | ○-Δ | ○ | ○-Δ |
| Oil repellency (deg) | 61 | 60 | 63 | 63 | 72 | 68 |
| Deformation | ○ | ○ | ○ | ○ | ○ | ○ |

TABLE 2

| Component (pbw) | Example 7 | 8 | 9 | 10 | 11 | 12 | 13 |
|---|---|---|---|---|---|---|---|
| Coating solution (1) | | | | | | | |
| Coating solution (2) | 100 | | | | | | |
| Coating solution (3) | | 100 | | | | | |
| Coating solution (4) | | | 100 | | | | |
| Coating solution (5) | | | | 100 | | | |
| Coating solution (6) | | | | | 100 | | |
| Coating solution (7) | | | | | | 100 | |
| Coating solution (8) | | | | | | | 100 |
| Coating solution (9) | | | | | | | |
| Coating solution (10) | | | | | | | |
| Coating solution (11) | | | | | | | |
| Compound of formula (E) | | | | | | | |
| Anti-staining agent A | | | | | | | |
| Anti-staining agent B | 0.5 | 0.5 | 0.5 | 0.5 | | | |
| Photoacid generator (F) | | | | | | | |
| Photoacid generator (G) | 0.1 | 0.1 | 0.1 | 0.1 | 0.1 | 0.1 | 0.1 |
| Dibutoxyanthracene | 0.01 | 0.01 | 0.01 | 0.01 | 0.01 | 0.01 | 0.01 |
| Mar resistance | ⊚ | ⊚ | ⊚ | ○ | ○-Δ | ○ | ○ |
| Chemical resistance | ○ | ○ | ○ | ○ | ○ | ○ | ○ |
| Antireflection (%) | 0.1 | 0.1 | 0.1 | 0.1 | 0.1 | 0.1 | 0.1 |
| Anti-staining | ○ | ○ | ○ | ○-Δ | ○ | ○ | ○ |
| Oil repellency (deg) | 75 | 72 | 74 | 70 | 68 | 69 | 72 |
| Deformation | ○ | ○ | ○ | ○ | ○ | ○ | ○ |

TABLE 3

| Component (pbw) | Comparative Example | | | |
|---|---|---|---|---|
| | 1 | 2 | 3 | 4 |
| Coating solution (1) | | | | |
| Coating solution (2) | | | | |
| Coating solution (3) | | | | |
| Coating solution (4) | | | | |
| Coating solution (5) | | | | |
| Coating solution (6) | | | | |
| Coating solution (7) | | | | |
| Coating solution (8) | | | | |
| Coating solution (9) | 100 | 100 | | |
| Coating solution (10) | | | 100 | |
| Coating solution (11) | | | | 100 |
| Compound of formula (E) | | | | |
| Anti-staining agent A | | | | |
| Anti-staining agent B | | 0.5 | 0.5 | 0.5 |
| Photoacid generator (F) | | | | |
| Photoacid generator (G) | | | 0.1 | 0.1 |
| Dibutoxyanthracene | | | 0.01 | 0.01 |
| Mar resistance | X | ◎ | ◎ | ◎ |
| Chemical resistance | ○ | ○ | ○ | X |
| Antireflection (%) | 0.1 | 0.1 | 7.4 | 4.5 |
| Anti-staining | X | ○-△ | ○ | ○ |
| Oil repellency (deg) | 65 | 72 | 75 | 70 |
| Deformation | ○ | X | ○ | ○ |

Japanese Patent Application No. 2009-027344 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A photocurable coating composition, comprising:
   (1) porous, hollow, or both porous and hollow inorganic oxide fine particles (A),
   (2) a hydrolytic condensate of a bissilane compound (B), a cohydrolytic condensate of a bissilane compound (B) and another hydrolyzable organosilicon compound (D), or both, the bissilane compound (B) having the formula:

$$X_nR_{3-n}Si—Y—SiR_{3-n}X_n \quad (B)$$

wherein Y is a divalent organic group which is optionally fluorinated or a divalent organic group which optionally comprises an aromatic ring, R is a monovalent organic group, X is OH or a hydrolyzable group, and n is 1, 2 or 3,
   (3) a compound capable of generating an acid upon light exposure, and
   (5) a (co)hydrolytic condensate of a reactive dimethylsiloxane (C), an organosilicon compound comprising the reactive dimethylsiloxane (C), or both, in an amount of from 1 to 25% by weight based on solids in the coating composition, the dimethylsiloxane (C) having the formula:

$$(R^1O)_3Si—R^2—((CH_3)_2SiO)_x—Si(CH_3)_3 \quad (C)$$

wherein $R^1$ is methyl, ethyl, propyl or butyl, $R^2$ is oxygen or $CH_2CH_2$, and x is an integer of from 5 to 50.

2. The coating composition of claim 1 wherein the inorganic oxide fine particles (A) are based on $SiO_2$.

3. The coating composition of claim 1 wherein the inorganic oxide fine particles (A) have an average particle size of 1 to 100 nm.

4. The coating composition of claim 1 wherein the bissilane compound (B) has the formula:

$$(CH_3O)_3Si—CH_2CH_2—C_mF_{2m}—CH_2CH_2—Si(OCH_3)_3$$

wherein m is an integer of 2 to 20.

5. The coating composition of claim 1 wherein component (2) is a cohydrolytic condensate of the bissilane compound (B) and a silane compound containing a fluorine-substituted perfluoroalkyl group having the formula:

$$F(CF_2)_aC_2H_4—SiR_{3-b}X_b \quad (D-1)$$

wherein R and X are as defined above, a is an integer of 1 to 12, and b is an integer of 1 to 3.

6. The coating composition of claim 1 wherein the (co) hydrolytic condensate as component (2) contains 3 to 12% by weight of silanol groups.

7. The coating composition of claim 1 wherein component (3) is an onium salt selected from the group consisting of $R^4{}_2I^+Z^-$, $R^4{}_3S^+Z^-$, $R^4{}_2R^5S^+Z^-$, $R^4R^5{}_2S^+Z^-$, $R^4—S—R^4S^+R^5{}_2Z^-$, $R^4{}_3Se^+Z^-$, $R^4{}_4P^+Z^-$, and $R^4N_2{}^+Z^-$, wherein $R^4$ is $C_6$-$C_{30}$ aryl, $R^5$ is $C_{1-30}$ alkyl, and $Z^-$ is an anion selected from the group consisting of $SbF_6{}^-$, $SbCl_6{}^-$, $AsF_6{}^-$, $PF_6{}^-$, $PF_n(Rf)_{6-n}{}^-$, $BF_4{}^-$, $B(C_6F_5)_4{}^-—HSO_4{}^-$, $ClO_4{}^-$, $Cl^-$, $HSO_4{}^-$ and $CF_3SO_3{}^-$, wherein Rf is a fluorinated alkyl group having 1 to 10 carbon atoms in which one or more hydrogen atoms of an alkyl group are replaced by fluorine atoms, and n is an integer of 0 to 5.

8. The coating composition of claim 1 wherein components (1) and (2) are present in a weight ratio of 10/90 to 70/30, and 0.1 to 30 parts by weight of component (3) is present relative to 100 parts by weight of components (1) and (2) combined.

9. The coating composition of claim 1, further comprising (4) a dialkoxyanthracene in an amount of 0.01 to 5 parts by weight relative to 100 parts by weight of components (1) and (2) combined.

10. The coating composition of claim 1 wherein component (5) is a cohydrolytic condensate of the reactive dimethylsiloxane (C) and an organosilicon compound comprising the hydrolyzable silane compound (D).

11. The coating composition of claim 1, which is used in forming an antireflective film.

12. A method for forming a film, comprising applying the coating composition of claim 1 onto a substrate, holding the coating at a temperature of up to 90° C. for up to 3 minutes, and illuminating the coating with light in a dose of up to 2,000 mJ/cm².

13. A coated article comprising a substrate and a coating of the coating composition of claim 1 disposed thereon as an outermost layer.

14. The coated article of claim 13 wherein the substrate is a transparent synthetic resin substrate.

15. A coated article comprising a substrate and a coating of the coating composition of claim 1 disposed thereon as an outermost layer, said coated article being low reflective.

16. A photocurable coating composition, comprising:
   a composite resin which is obtained from (co)hydrolytic condensation of (2) a bissilane compound (B) or a bissilane compound (B) and another hydrolyzable organosilicon compound (D) in the presence of (1) porous, hollow, or both porous and hollow inorganic oxide fine particles (A), the bissilane compound (B) having the formula:

$$X_nR_{3-n}Si—Y—SiR_{3-n}X_n \quad (B)$$

wherein Y is a divalent organic group which is optionally fluorinated or a divalent organic group which optionally comprises an aromatic ring, R is a monovalent organic group, X is OH or a hydrolyzable group, and n is 1, 2 or 3, wherein the hydrolytic condensate of component (2) is integrated with component (1) to form the composite resin,
   (3) a compound capable of generating an acid upon light exposure, and
   (5) a (co)hydrolytic condensate of a reactive dimethylsiloxane (C), an organosilicon compound comprising the reactive dimethylsiloxane (C), or both, in an amount of from 1 to 25% by weight based on solids in the coating composition, the dimethylsiloxane (C) having the formula:

$$(R^1O)_3Si-R^2((CH_3)_2SiO))_x-Si(CH_3)_3 \quad (C)$$

wherein $R^1$ is methyl, ethyl, propyl or butyl, $R^2$ is oxygen or $CH_2CH_2$, and x is an integer of from 5 to 50.

17. The coating composition of claim 16, further comprising (4) a dialkoxyanthracene in an amount of 0.01 to 5 parts by weight relative to 100 parts by weight of components (1) and (2) combined.

18. A method for forming a film, comprising applying the coating composition of claim 16 onto a substrate, holding the coating at a temperature of up to 90° C. for up to 3 minutes, and illuminating the coating with light in a dose of up to 2,000 mJ/cm².

19. A coated article comprising a substrate and a coating of the coating composition of claim 16 disposed thereon as an outermost layer.

* * * * *